United States Patent
Sipponen (10) Patent No.: US 7,333,946 B1
(45) Date of Patent: Feb. 19, 2008

(54) TICKETING WITH PRINTING OPTION

(75) Inventor: Juha-Pekka Sipponen, Helsinki (FI)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 09/843,718

(22) Filed: Apr. 30, 2001

Related U.S. Application Data (60) Provisional application No. 60/229,320, filed on Sep. 1, 2000.

(51) Int. Cl.
*G06Q 30/00* (2006.01)

(52) U.S. Cl. ........................................ 705/26
(58) Field of Classification Search ................ 705/26, 705/27
See application file for complete search history.

(56) References Cited

U.S. PATENT DOCUMENTS

| | | | | |
|---|---|---|---|---|
| 5,455,953 A | * | 10/1995 | Russell ................ | 710/266 |
| 5,598,477 A | * | 1/1997 | Berson ................ | 380/51 |
| 5,754,654 A | * | 5/1998 | Hiroya et al. .......... | 705/76 |
| 5,794,207 A | * | 8/1998 | Walker et al. .......... | 705/1 |
| 5,797,126 A | | 8/1998 | Helbling et al. | |
| 5,848,161 A | * | 12/1998 | Luneau et al. .......... | 705/78 |
| 6,202,151 B1 | * | 3/2001 | Musgrave et al. ....... | 713/186 |
| 6,216,227 B1 | * | 4/2001 | Goldstein et al. ....... | 713/172 |
| 6,223,166 B1 | * | 4/2001 | Kay ..................... | 705/26 |
| 6,373,587 B1 | * | 4/2002 | Sansone ................ | 358/1.15 |
| 6,603,568 B1 | * | 8/2003 | Sansone ................ | 358/1.14 |
| 6,728,000 B1 | * | 4/2004 | Lapstun et al. ......... | 358/1.15 |
| 2001/0034716 A1 | * | 10/2001 | Goodwin ............... | 705/60 |
| 2002/0010604 A1 | * | 1/2002 | Block .................. | 705/6 |
| 2002/0047861 A1 | * | 4/2002 | LaBrie et al. .......... | 345/733 |

FOREIGN PATENT DOCUMENTS

| | | |
|---|---|---|
| FI | 20002319 | 10/2000 |
| GB | 0012195 | 5/2000 |
| GB | 0015716 | 6/2000 |
| GB | 0025198 | 10/2000 |

OTHER PUBLICATIONS

Marlin, Steven "SET making slow progress in banking arena", Bank Systems and Technology, v36n8, Aug. 1999. Retrieved from Dialog File:15, Acc#:01858296.*

Marlin, Steven "New e-commerce specification marries, EMV, SET", Bank systems and Technology, v37,n3, Mar. 2000. Retrieved from Dialog File: 15, Acc#:01993069.*

Tehrani, Rich "Put on a hacker-proof vest", Call Center Solutions, v18,n3, Sep. 1999. Retrieved from Dialog File:15, Acc#:01993677.*

(Continued)

*Primary Examiner*—Naeem Haq
(74) *Attorney, Agent, or Firm*—Banner & Witcoff, Ltd.

(57) ABSTRACT

A method of purchasing and printing a ticket from a wireless device. A wireless device selects and pays for a ticket from a wireless terminal. The ticket is printed at a later time in order to reduce the possibility of the losing it. A printing device is selected by the purchaser and requests the ticket to be printed when desired using the portable terminal. The printing device and the ticket server are interconnected through the Internet, for example, with various checks being performed before the ticket is printed.

15 Claims, 8 Drawing Sheets

OTHER PUBLICATIONS

Harler, Curt "Signed, sealed and deliverd", Communications International v27,n1, Jan. 2000. Retrieved from Dialog File:15, Acc#:01974373.*

Johnston, Margret "Digital signature bills passes by Congress", InfoWorld, v21,n48, Nov. 29, 1999. Retrieved from Dialog File:15, Acc#: 01960246.*

Anderson et al. "Rights management and security in the electronic library", American Society for Information Science, Oct./Nov. 1995, v22n1, pp. 21-23. Retrieved from Dialog File 15, Acc#: 01124199.*

* cited by examiner

FIG. 6 ically it's from an external source.

TICKETING WITH PRINTING OPTION

This application relates to U.S. Provisional Application Ser. No. 60/229,320, filed Sep. 1, 2000, hereby incorporated by reference.

BACKGROUND OF THE INVENTION

1. Field of the Invention

The present invention relates to the field of telecommunications and mobile terminals, hereinafter also referred to as personal trusted devices (PTD). More particularly, the present invention relates to mobile terminals capable of communication to the Internet or other networks to buy electronic tickets or products.

2. Description of the Prior Art

Finnish Patent Application FI104859B discloses a method for purchasing services or goods by establishing a telecommunication connection, via a network server of the seller. The buyer selects, confirms and/or pays for the selected goods and services or equivalent objects after which the server has verified the user, connection and credibility. Then the server confirms the transaction being successfully made and conveys to the purchaser a receipt of the successful transaction. The telecommunications terminal used is a portable unit, which is connected to a server, as a result of a successful transaction. A receipt including purchaser specific identification is conveyed to the portable telecommunication terminal and stored in the memory therein.

SUMMARY

A user of the invention may order a ticket with a PTD or mobile terminal over a wireless network. The purchased electronic ticket is saved in a memory of a server of a Ticket Service Provider (TSP) which stores a reference identifier of the ticket, the detailed information which defines the ticket's characteristics to which an identifying stamp of the TSP is attached. When the user wants to have the ticket printed some time before the starting time of the event associated with the purchased ticket, the user initiates printing to the server of the TSP with the ticket reference information and an identification of the printing device to be used to print the ticket. The printing device is a qualified printing device which the TSP approves to be used to perform the printing. After qualifying the printing device, a server of the TSP sends the ticket identified by the identifying stamp to be printed to the qualified printing device and a user is provided with the printed ticket.

The PTD may be connected to the Internet via a mobile gateway using for example a Wireless Application Protocol (WAP) gateway or a General packet radio service (GPRS) gateway and a gateway GPRS service node (GGSN) to a TSP. Such a terminal to point of service arrangement via a GPRS network is described in U.S. patent application Ser. No. 09/461,353 filed Nov. 15, 1999, which application is incorporated by reference herein in its entirety, in which a mobile terminal may receive an electronic coupon. The mobile terminal stores the received coupon locally. The coupon includes an identification of the form. The coupon may be transferred from the mobile terminal to another terminal.

U.S. patent application Ser. No. 09/572,905, filed on May 17, 2000, which application is incorporated by reference herein in its entirety, describes a mobile device, which pays and downloads digital products using the Internet.

The problem to be solved is to permit the user to have the purchased ticket printed as late as possible (before the event starts). Losing the ticket is minimized with the invention since the ticket may be printed just before its use. Another problem, which is solved by the invention, is to have a secured connection from the TSP to the printing service provider, when the printing is not done inside the TSP network.

The TSP may use an external service provider for providing ticket printing services to ticket buyers which creates new business opportunities for a printing service provider, while still having secured ticket printing which prevents fraudulent ticket production.

Advantageously, the user, who purchased the electronic ticket, is verified by the TSP and is saved in the TSP's database securely until the ticket is needed to be used. Preferably, the ticket is available to the mobile terminal user when it is requested to have the ticket in paper (or similar) form. Preferably the ticket is printed in the printing device (and possibly by a printing service provider) in a secure manner so that a user can be trusted to have received the ticket after successful printing is performed, so as to prevent fraudulent ticket printing from an external source.

DETAILED DESCRIPTION OF THE PREFERRED EMBODIMENTS

Figure 1A:
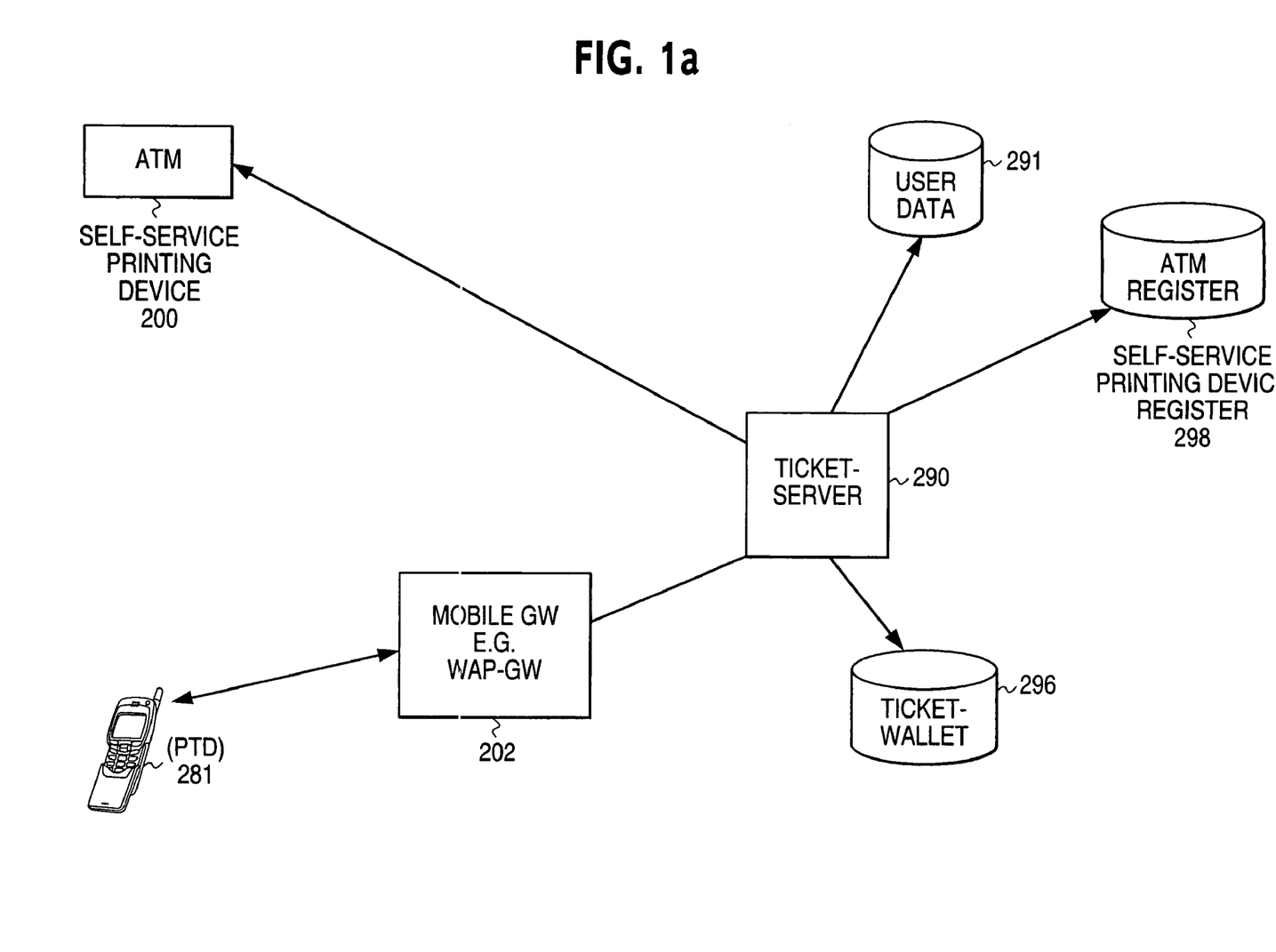
FIG. 1a illustrates a first architecture in accordance with the present invention.

FIG. 1a illustrates a mobile terminal or PTD which navigates or browses via a mobile gateway 202 over a wireless network to a ticket server 290 of a TSP. The server 290 is connected to user database 291. The electronic ticket is stored in the memory 291 of an authorized server of the TSP including a reference identifier of the ticket. A Ticket Wallet database 296 is the memory storage where the purchased tickets are stored for further usage. When the user wants to have the ticket printed before an event associated with the ticket starts, the user initiates a printing request to the server 290 of the TSP containing ticket reference information and an identification of the authorized printing device which is called self-service printing device 200. An accepted device 200, can be verified by the TSP when the user requests the ticket to be printed. The TSP is connected to a database or a register 298 which stores the identification of acceptable printing devices 200 and may be an ATM as illustrated. The TSP also is connected to the ticket wallet 296 where the TSP stores user specific information e.g. the user reference number, signatures, etc.

Figure 1B:
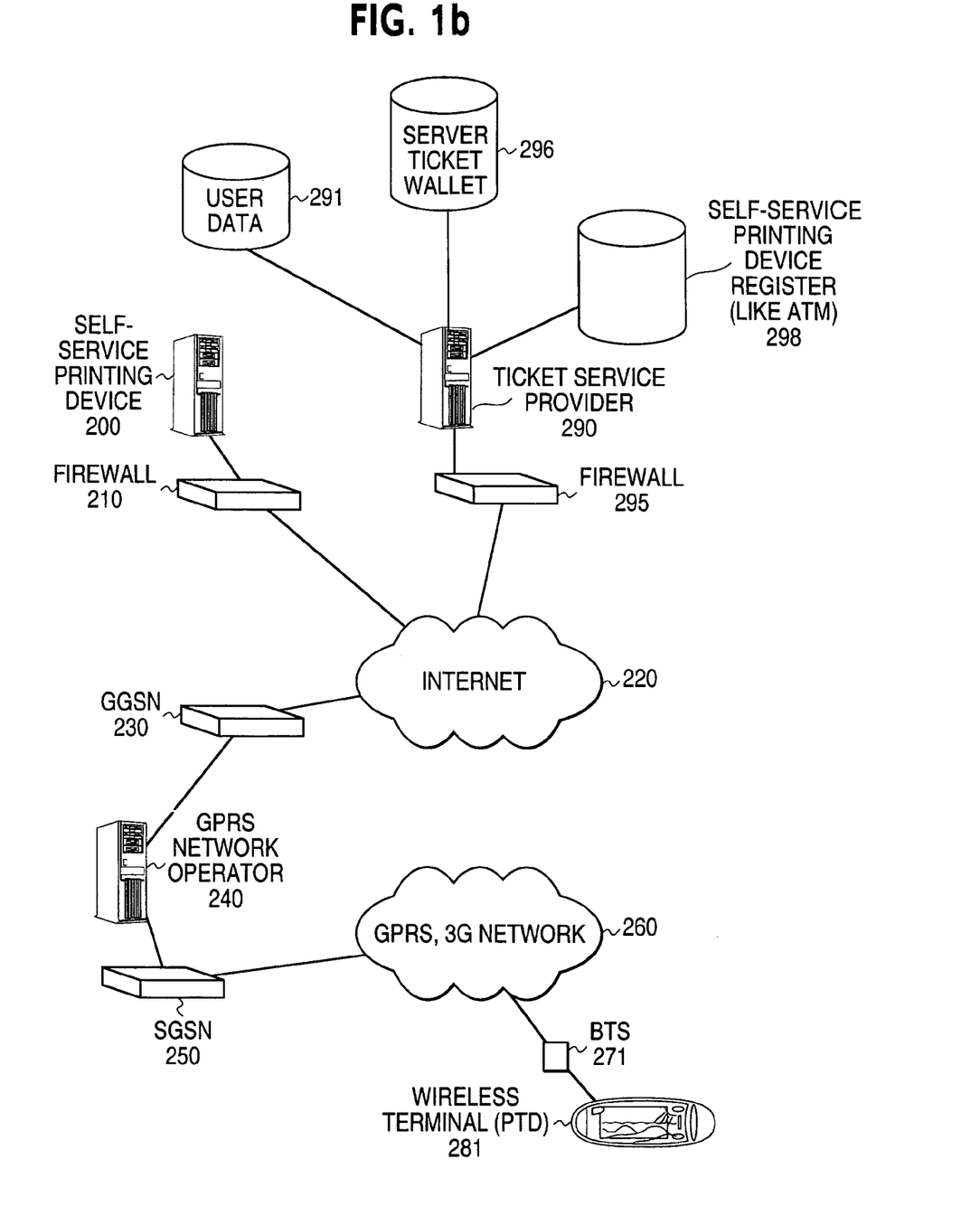
FIG. 1b illustrates a second architecture in accordance with the present invention.

In FIG. 1b illustrates a PTD 281, which is connectable via a GPRS network 260 base through a BASE transceiver station (BTS) 271, the radio network section of the GPRS (or even 3$^{rd}$ generation radio network) 260, a serving GPRS support node (SGSN) 250, a GPRS network operator 240, a gateway GPRS support node (GGSN) 230 to the Internet 220. The server 290 of the TSP may be connected via a firewall 295 to the Internet 220. The GPRS network architecture and services is described in ETSI GSM, specification 03.60 in its entirety and is known. The TSP is connected to registers or databases 291 of user data, ticket wallet 296 and databases 298 of accepted self-service printing devices 200. The self-service printing devices 200 may belong to a network of a printing provider, which comprises plural self-service printing devices located in the network of the Printing Service Provider and are available to the users. If a WIM card is attached to the PTD 281, the connection protocol (a WAP connection between the terminal and the network server) may be WTLS version 3 or later. If a WIM card is not attached to the PTD 281, the user gives authentication information (user identification and password) and then the connection protocol is basic WTLS (version 1).

Figure 2:
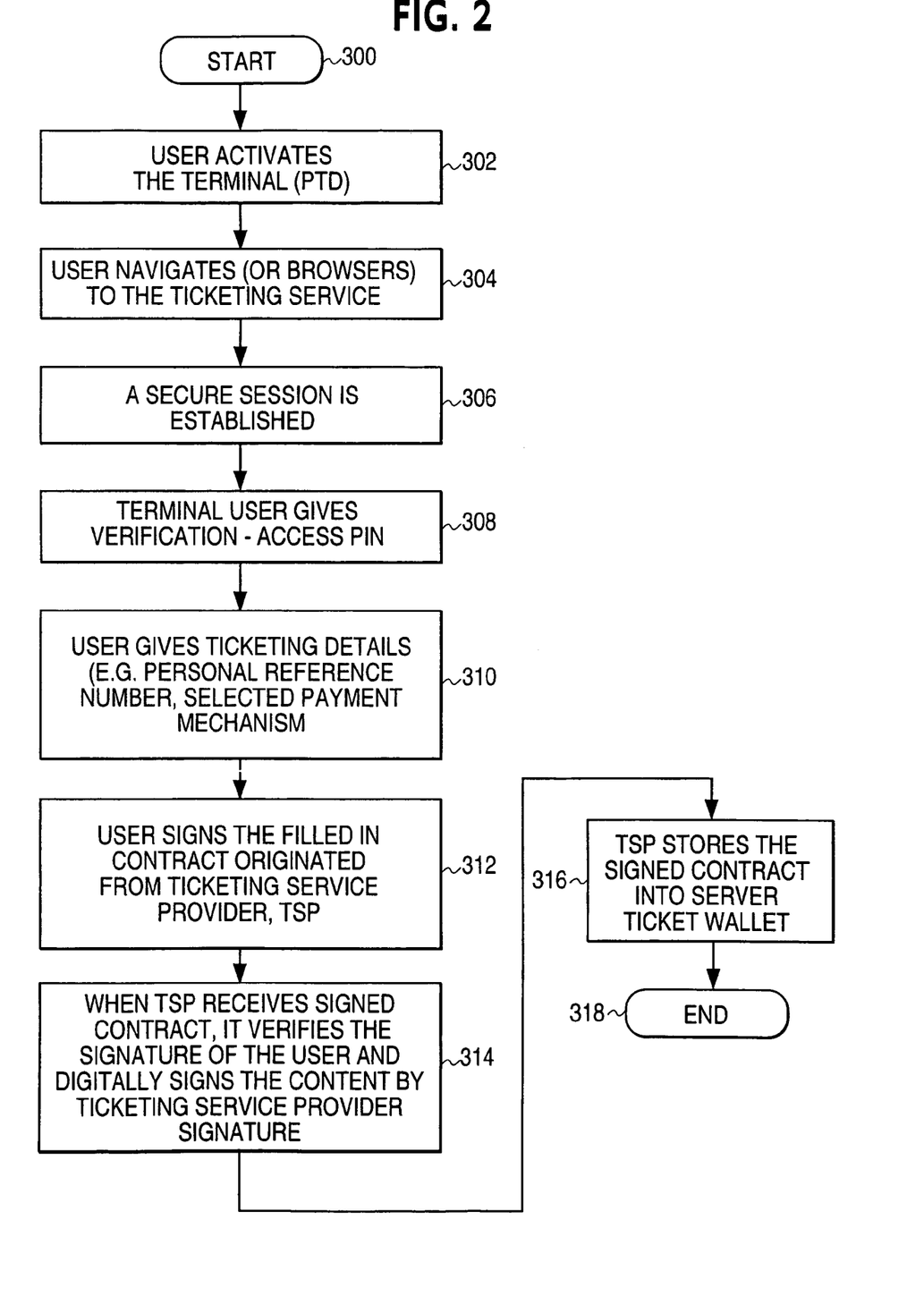
FIG. 2 illustrates a method in accordance with the present invention when a user purchases an electronic ticket from a TSP and the ticket is stored in the TSP's database.

FIG. 2 illustrates a ticket buying method starting at point 300. Thereafter at point 302, the user activates PDT 281. The user navigates (or browsers) at point 304 in the network to the ticket services offered by the TSP 290. A secured session at point 306 is established for instance by using the WTLS protocol from the terminal to the point of service (the TSP) when the embodiment of FIG. 1 a is used. In FIG. 1b, a secured connection is established at point 306 for instance by using an encrypted communication context from the PTO 281 to the TSP by using any known encryption arrangement like RSA, Diffie-Hellman etc. which are known. Then the terminal user at point 308 is verified to have access using a PIN (personal identification number). A wireless information module (WIM) can be attached to the PTD 281, but if it is not the user may give his user name and password. Then the user selects ticket(s) to be purchased from the TSP or provides the detailed information of the ticket(s) into a WML form, that is presented in the user interface of the PTD. The user provides ticketing details (e.g. personal reference number and selected payment mechanism) at point 310. The payment mechanisms are known and are not described herein. Then the completed contract or WML form is signed with the user's signature (from a WIM card or given as authorized access information) and sent to the TSP as indicated at point 312. When the TSP has received a signed contract at point 314, the TSP verifies the signature of the user (the verification can be made against the signature in the user data database). The TSP server signs the acceptable ticket contract which payment is also collectable from the selected payment mechanism. The TSP's signature is attached at point 314 to the ticket contract and stored at point 316 for later usage by the ticket wallet 296.

Figure 3:
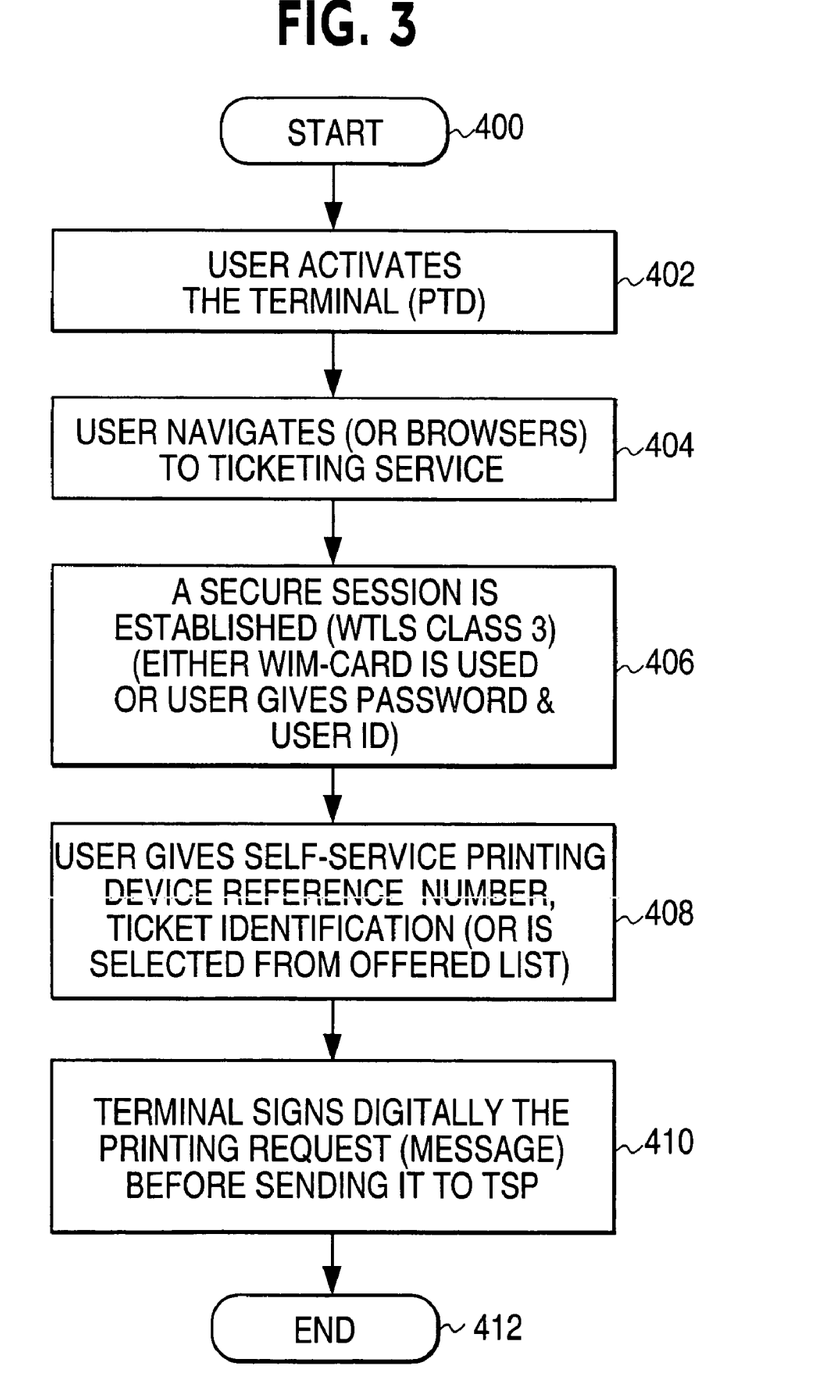
FIG. 3 illustrates a method of how a user requests printing of the purchased ticket from the database of the TSP.

FIG. 3 illustrates the user having a ticket printed. The process proceeds from starting point 400 to point 402 at which the user activates the PTD 281. At point 404, the user navigates or browses the TSP. A secured session is established at point 406 between the PTD and the point of service TSP 290, either by having the user give authentication information or WIM with an available bearer wireless interface ciphering or available context connection encryption methods. The user gives the reference number of the desired self-service printing device (that is selected to print out the ticket) and the ticket identification (or selects it from an offered list from the user interface) at point 408, which are user signed at point 410 by the PTD 281 before sending the printing request message to the TSP. Then the overall printing procedure ends at point 412 and the next method as described in FIG. 4a or FIG. 4b is started.

Figure 4A:
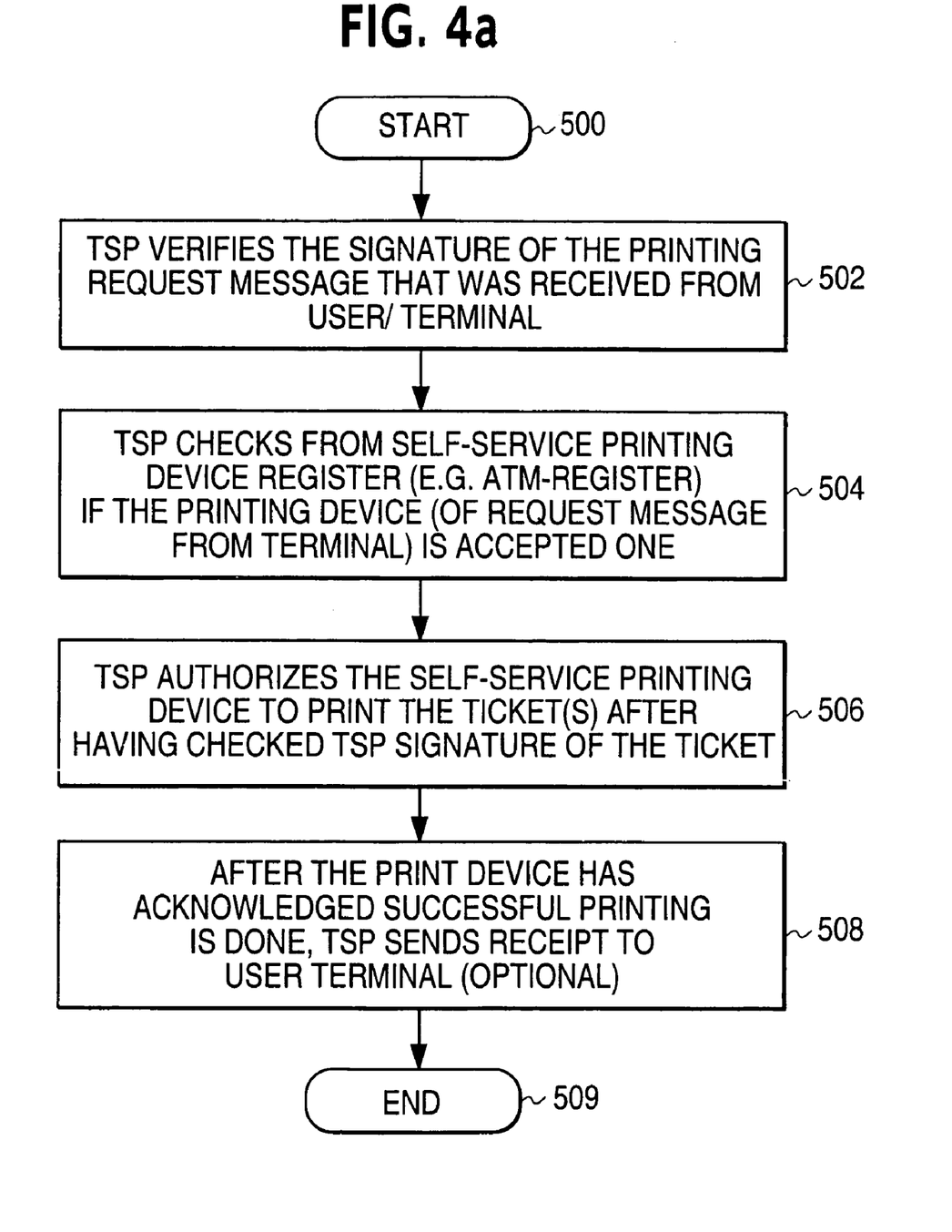
FIG. 4a illustrates a method of how the TSP causes an authorized printing device to print a ticket.

FIG. 4a illustrates the actual printing event method initiated at point 500 from the TSP 298 resulting in the paper or other kind of physical ticket being printed out by the self-service printing device 200. The TSP verifies at point 502 first the signature of the buyer that is received in the printing request message. The TSP checks at point 504 the signature of the purchaser against the user signature stored in the database of the user data 296. Then the TSP checks at point 504 if the requested printing device 200 belongs to acceptable printing devices. The check is made with the register or database of the self-service printing device register 298. Then the identified ticket (or whole contract) is fetched from the server or database of the ticket wallet 296. The contract/ticket fetching and steps 502 and 504 can be processed in a different order than illustrated. Then at point 506, the TSP forwards the ticket information to the requested self-service printing device 200 after having verified the TSP signature to be a valid signature of the TSP, which is attached to the electronic ticket. The printing device 200 prints out the ticket and after the printing acknowledges the event to the TSP, which may save the acknowledgment in any history file of user data or elsewhere in the TSP network. The receipt of the printed electronic ticket is forwarded from the TSP to the terminal 281 either in WML form or in any other form at point 508. The process ends at point 509.

Figure 4B:
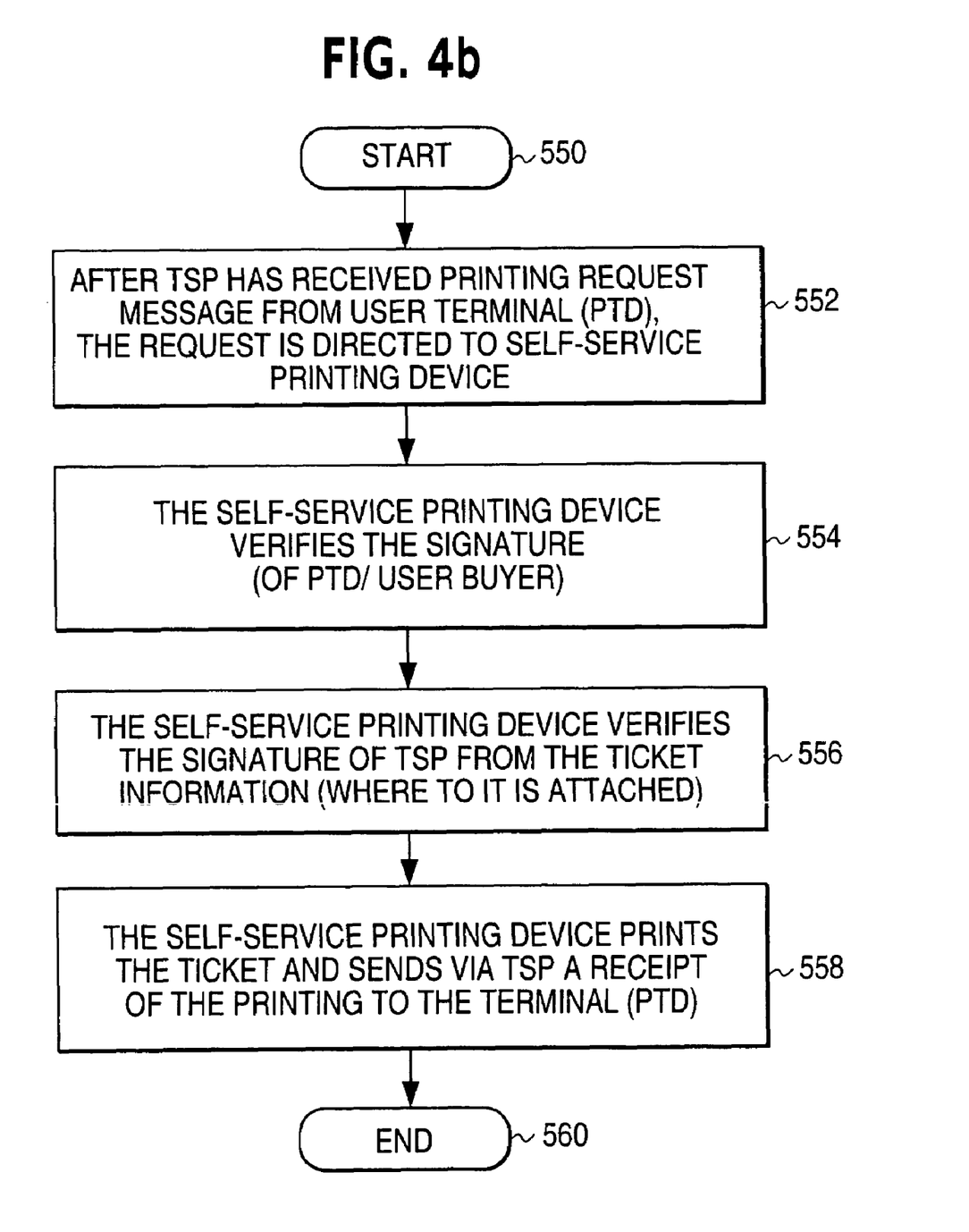
FIG. 4b illustrates another method in accordance with the invention of how the TSP causes an authorized printing device to print a ticket.

After printing is completed in FIG. 4a, the process of FIG. 4b is started. After the TSP has received a printing request message from the PTD 281, the request is directed to the self-service printing device 552. The self-service printing device verifies at point 554 the signature of the user. If the printing device does not have a direct connection to user data, the device may request the user data from the TSP which information is provided in the answer message to the printing device 200 or the TSP may have attached the necessary user information to the forwarded printing request message (that was originated from the PDT 281) so that self-service printing device can verify the user signature without making any additional request from the TSP. The TSP sends the ticket information to the self-service printing device as an attachment to the original purchase print request message or another message is sent following the original purchase printing request message as a separate message, which contains the ticket information. The self-serving printing device 200 verifies the TSP signature that is attached to the ticket information at point 556. In this manner, external and fraudulent ticket printing requests can be identified from acceptable ones. Finally, the self-service printing device prints the ticket for the buyer at a location typically next to the printing device. A receipt of the printed ticket is sent from self-service printing device 200 to the TSP of which a copy may be stored in the user data database 296 if required and the TSP forwards the receipt of the printing event to the PDT 281 either in WML or in any other text form as indicated at point 558. The process ends at point 560.

The printing service provider and the ticket service provider may share the ticket selling fees paid by the actual event organizer (to whose event the ticket gives access rights to the owner).

Figure 5:
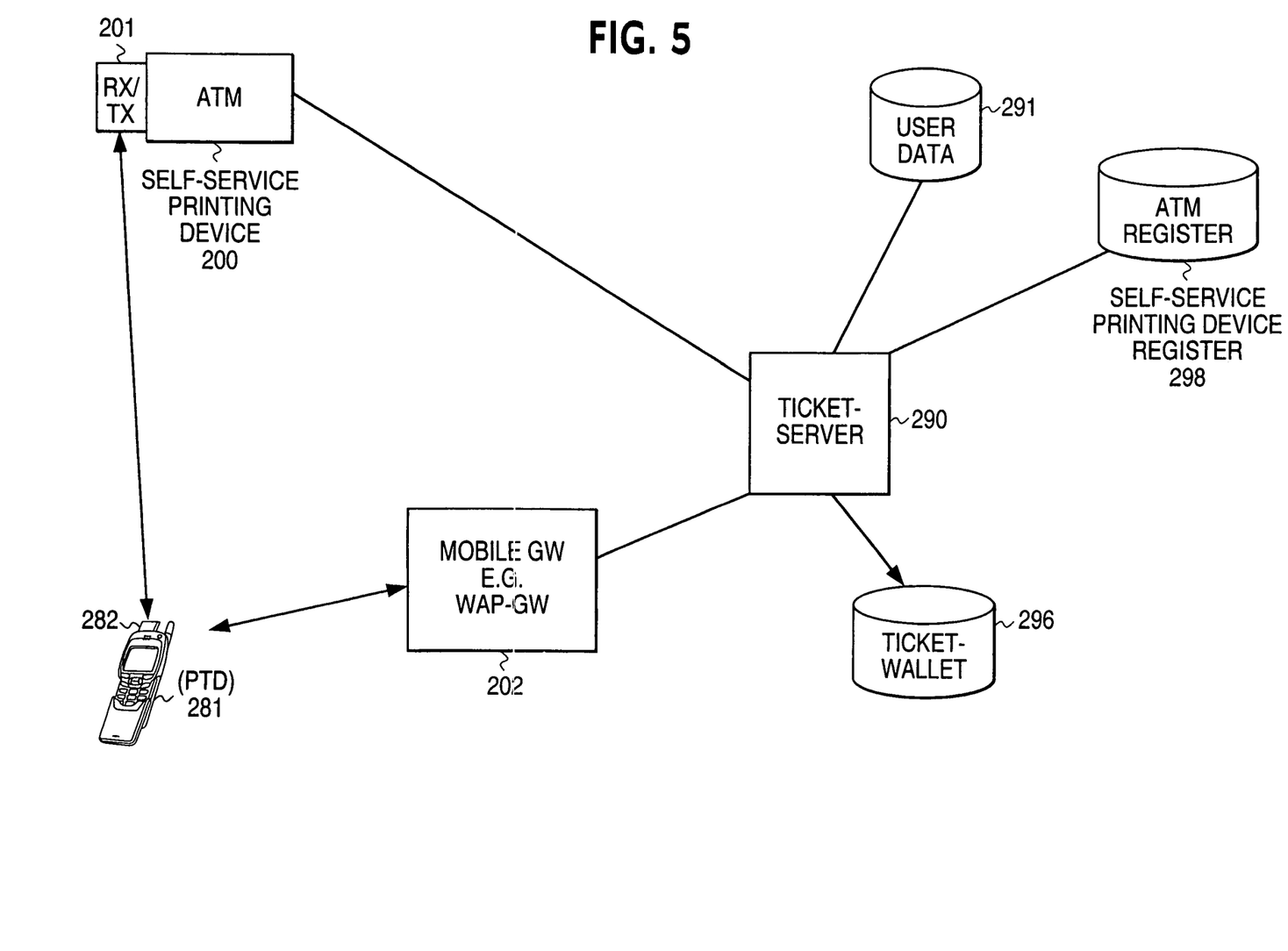
FIG. 5 illustrates a third architecture in accordance with the present invention having a low power radio connection between the PDT and the self-service printing device.

Another ticket printing method in accordance with the invention uses the architecture of FIG. 5. PTD 281 and printing device 200 communicate (send and receive) via a low power radio link (like Bluetooth™) 201 and 282. Then the PTD 281 may establish communications (by using the low power radio transceiver 282 section) directly to the intelligent self-service printing device 200 and via the RX/TX (receiving/transmitting) section of low power radio link 201, which is connected to the self-service printing device 200. The intelligent self-serving printing device includes a control unit and memory as well as communication connections to a wired network and the wireless low power radio link interface.

Figure 6:
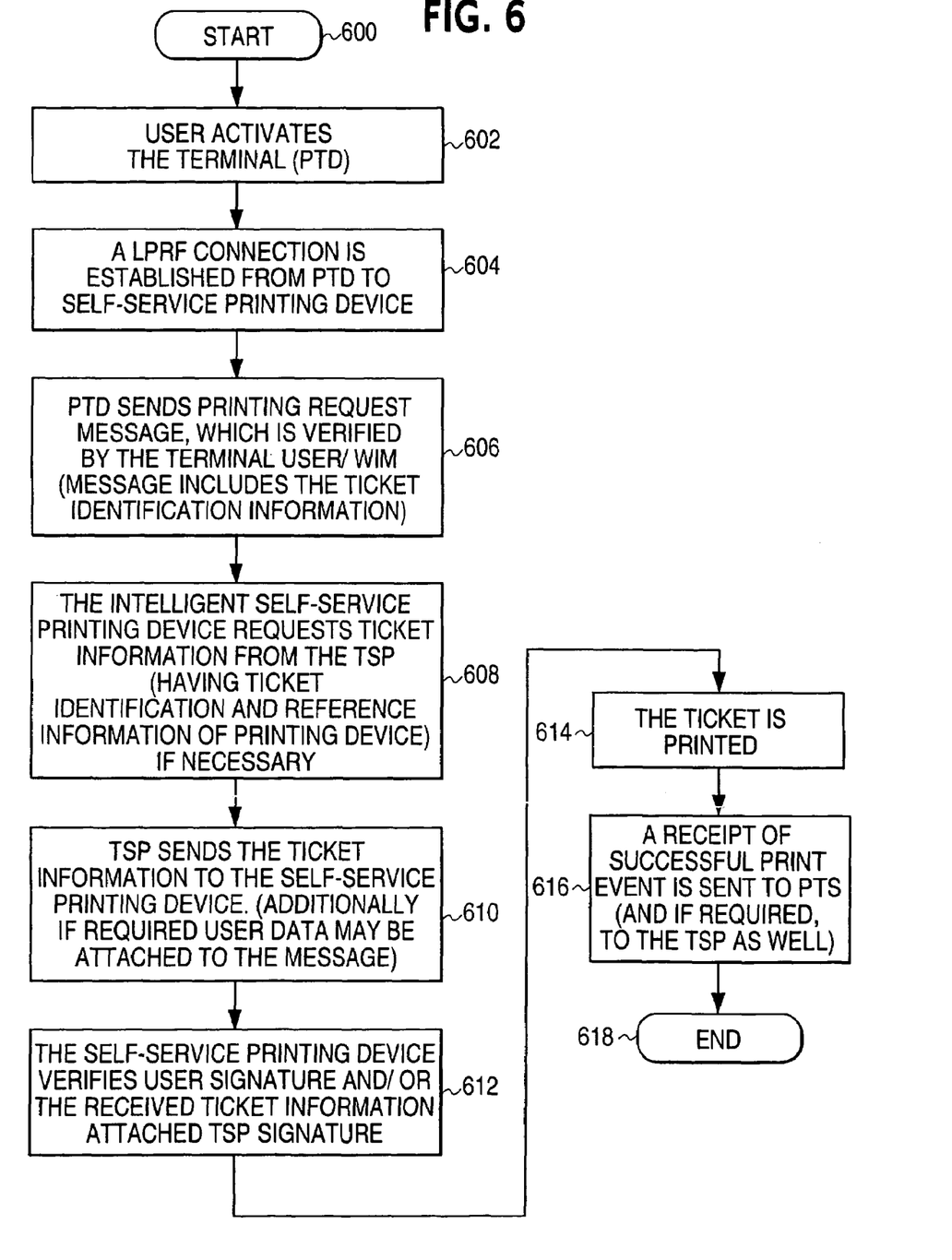
FIG. 6 illustrates another method in accordance with the present invention using the architecture of FIG. 5 by which a user requests printing of the purchased ticket from the database of the TSP.

FIG. 6 illustrates a printing method using the architecture shown in FIG. 5. First, the PTD 281 establishes a communication connection (by using transceiver 282) to the self-service printing device 200 and via the RX/TX section 201. This connection to the self-service printing device is established at points 600,602 and 604. Then PTD 281 sends a printing request message at point 606 to self-serving printing device 200. Either the user has given authentication information or WIM is used and available bearer air interface ciphering and possibly available context connection encryption methods are used. The user ticket identification (or selects it from an offered list from the user interface), which are user signed by the terminal before sending the printing request message to the self-serving printing device, is requested. Now the user may not need to give the reference number of the self-service printing device (that is required to print out the ticket), since the specific printing device is connected directly by the PTD via the low power radio air interface connection. If the printing device does not have direct connection to user data, it may request the user data from the TSP in the same request as the ticket information requested at point 608. The intelligent self-serving printing device attaches to the ticket information request message the reference number of the self-service printing device if the printing device identity is not known from other information such as address fields of the request message at point 608. The requested information is provided in the answer message 610 sent to the intelligent self-serving printing device 200. The answer message may also contain some user data, if the self-serving printing device requires user specific information like a user signature so that the intelligent printing device can verify the initially sent user message and the printing request message. The self-serving printing device 200 verifies the TSP signature that is attached to the ticket information at point 612. In that way external and fraudulent ticket printing requests can be identified from acceptable ones. The user verification may be processed either in the TSP when the ticket information was requested or in the intelligent self-serving printing device when the necessary user data is available for the signature verification. Finally, the self-service printing device prints the ticket for the purchaser located next to the printing device as indicated at point 614. A receipt of the printed ticket is sent at point 616 from self-service printing device 200 to the PTD 281. A copy of the receipt may be sent also to the TSP 290 and the copy may be saved in the user data database 296 or elsewhere in the TSP network. The process ends at point 618.

While the invention has been described in terms of its preferred embodiments, it should be understood that numerous modifications may be made thereto. It is intended that all such modifications fall within the scope of the appended claims.

The invention claimed is:

1. A system comprising:

a ticket service provider server providing a selection of tickets for purchase by a user of a mobile personal trusted device through a wireless communication network, wherein the mobile personal trusted device is configured to provide a digitally signed contract to purchase a selected ticket and an identification of a purchased ticket to the communication network for transmission to the ticket service provider; wherein the ticket service provider server authenticates the user of the mobile personal trusted device to purchase the purchased ticket and verifies the digitally signed contract by verifying a digital signature of the contract, and further comprises a computer-readable medium that records the verified digitally signed contract and an identification of the ticket; and an authorized output device in communication with both the mobile personal trusted device and the ticket service provider server, that is selected by the mobile personal trusted device through a digitally signed request from the mobile personal trusted device to the ticket service provider server to output the purchased ticket, wherein the authorization is provided by the ticket service provider.

2. The system of claim 1, wherein the authorized output device is in communication with the ticket service provider server through the Internet.

3. The system of claim 1, wherein the output from the authorized output device comprises a printed ticket.

4. The system of claim 1, wherein the authorized output device is in communication with the mobile personal trusted device through a low power RF connection.

5. The system of 1, wherein authorized output device is configured to store a confirmation of the output.

6. A ticket service provider server comprising:

a wireless communication pathway with a communication network comprising a mobile personal trusted device, wherein the server provides a selection of tickets for purchase by a user of the mobile personal trusted device;

an apparatus which receives from the communication network a digitally signed contract and an identification of a purchased ticket transmitted from the mobile personal trusted device through the communication network;

an apparatus configured to authenticate the user of the mobile personal trusted device to purchase the purchased ticket;

a verifying apparatus which verifies a digitally signed contact received from the mobile personal trusted device created in association with purchasing of the purchased ticket by verifying of a digital signature;

an apparatus for recording the verified digitally signed contract and an identification of the ticket in a memory;

an apparatus configured to verify a digitally signed request from the mobile personal trusted device for an authorized output device to output the purchased ticket; and an apparatus to provide authorization from the ticket service provider server to the authorized output device requested by the mobile personal trusted device to output the purchased ticket.

7. The ticket service provider server of claim 6, wherein the ticket service provider server is in communication with the authorized output device through the Internet.

8. The ticket service provider server of claim 6, wherein the output from the authorized output device comprises a printed ticket.

9. The ticket service provider server of claim 6, wherein the authorized output device is in communication with the mobile personal trusted device through a low power RF connection.

10. The ticket service provider server of 6, wherein authorized output device is configured to store a confirmation of the output.

11. A computer-readable medium with computer-executable instructions that when executed perform the steps comprising:

providing through a wireless communication pathway to a communication network comprising a mobile personal trusted device, a selection of tickets for purchase by a user of the mobile personal trusted device;

determining the reception from the communication network a digitally signed contract and an identification of a purchased ticket transmitted from the mobile personal trusted device through the communication network;

authenticating the user of the mobile personal trusted device to purchase the purchased ticket;

verifying a digitally signed contact received from the mobile personal trusted device created in association with purchasing of the purchased ticket by verifying of a digital signature;

recording the verified digitally signed contract and an identification of the ticket in a memory;

verifying a digitally signed request from the mobile personal trusted device for an authorized output device to output the purchased ticket; and providing authorization from the ticket service provider server to the authorized output device requested by the mobile personal trusted device to output the purchased ticket.

12. The computer-readable medium of claim 11, wherein the ticket service provider server is in communication with the authorized output device through the Internet.

13. The computer-readable medium of claim 11, wherein the output from the authorized output device comprises a printed ticket.

14. The computer-readable medium of claim 11, wherein the authorized output device is in communication with the mobile personal trusted device through a low power RF connection.

15. The computer-readable medium of claim 11, wherein authorized output device is configured to store a confirmation of the output.

* * * * *